United States Patent [19]

Ivy et al.

[11] 4,241,061
[45] Dec. 23, 1980

[54] OXAZOLIDINYL-QUINOXALINES AND USE AS GROWTH PROMOTERS

[75] Inventors: Richard E. Ivy; Vernon V. Young; Robert D. Williams, all of Terre Haute, Ind.

[73] Assignee: International Minerals & Chemical Corp., Terre Haute, Ind.

[21] Appl. No.: 40,833

[22] Filed: May 21, 1979

[51] Int. Cl.³ .................. C07D 413/04; C07D 31/495
[52] U.S. Cl. ..................................... 424/250; 426/532; 544/353
[58] Field of Search .................. 424/250; 426/532; 544/353

[56] References Cited

U.S. PATENT DOCUMENTS

| | | | |
|---|---|---|---|
| 3,647,790 | 3/1972 | Potoski | 544/353 |
| 3,870,718 | 3/1975 | Abu El-Haj | 544/353 |

FOREIGN PATENT DOCUMENTS 763377  8/1971  Belgium ................................. 544/353

*Primary Examiner*—Mark L. Berch
*Attorney, Agent, or Firm*—Robert H. Dewey

[57] ABSTRACT

A composition represented by the formula

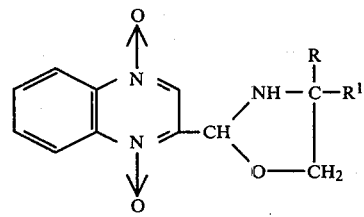

where R and R¹ can be hydrogen, methyl, ethyl or hydroxymethyl and can be the same or different. The compounds are useful for promoting the growth of animals.

15 Claims, No Drawings

OXAZOLIDINYL-QUINOXALINES AND USE AS GROWTH PROMOTERS

BACKGROUND OF THE INVENTION

This invention relates to substituted quinoxaline dioxides. In a particular aspect this invention relates to a method of promoting the growth of animals.

In the business of raising animals for food, it is essential to feed the animals those rations and adjuncts thereto, such as growth promoter stimulants, that provide a rapid weight gain and a high conversion of feed to animal weight. Such compounds cause the animal to gain weight faster during the growth period, thus shortening the time required to bring the animal to market weight. A growth stimulant is a compound which elicits a response of an animal toward its optimum genetic potential from a depression in growth rate and feed efficiency caused by intestinal bacterial flora, stress and subclinical diseases. Some compounds also act to improve feed efficiency, i.e. they permit the animal to gain more weight per unit weight of food than would occur without the compound. Such compounds are highly advantageous in raising animals for food. Antibiotics such as penicillin, bacitracin and tetracyclines have been widely used for this purpose. Antibiotics have several disadvantages, however. There is the possibility that resistant strains of pathogenic organisms may develop. Also, these antibiotics are expensive to use. Accordingly, there is a need for other agents to stimulate the growth of animals.

SUMMARY OF THE INVENTION

It is an object of this invention to provide substituted quinoxaline dioxides.

It is another object of this invention to provide a method for promoting the growth of animals.

It is yet another object of this invention to provide a method for improving the feed efficiency of animals.

Still other objects of this invention will be apparent to those skilled in the art from the disclosure herein.

It is the discovery of this invention to provide compounds represented by the formula

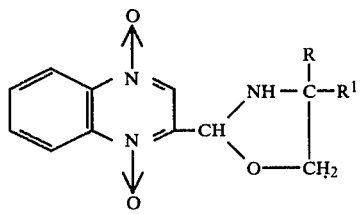

where R and $R^1$ can be hydrogen, methyl, ethyl or hydroxymethyl. R and $R^1$ can be the same or different. The compounds are effective for promoting the growth of animals and they also improve the feed efficiency of the animal receiving such a compound. The preferred compounds are those where R and $R^1$ are each hydrogen or methyl.

DETAILED DISCUSSION

The substituted quinoxalines of the present invention are prepared by reacting in about a 1:1 mole ratio 2-formylquinoxaline-1,4-dioxide hydrate and an alkanolamine of the formula

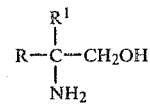

where R and $R^1$ can be hydrogen, methyl, ethyl or hydroxymethyl and can be the same or different.

The reaction proceeds readily, especially at elevated temperatures and under alkaline conditions. Advantageously, a lower alkyl alcohol, e.g. of from 1 to 4 carbon atoms, preferably methanol, is used as a solvent. When a solvent is used, the formyl quinoxaline dioxide hydrate and alkaline agent are preferably heated to near reflux temperatures, then the alkanolamine is added with agitation and the heat source is removed. Agitation is continued until the mixture reaches room temperature, during which time a precipitate forms. It is separated from the mother liquor, e.g. by filtration, centrifugation or decantation, and preferably rinsed with a small amount of alkanol solvent, e.g. methanol. When preferred, the product can be recrystallized from an alcohol solvent.

The formyl quinoxaline dioxide hydrate used in the practice of this invention can be prepared by the acid hydrolysis of 2-formylquinoxaline-1,4-dioxide dimethyl acetal, which is a known compound, described by M. J. Haddadin et al., British Pat. No. 1,305,138. The hydrate compound is readily obtained by dissolving the dimethyl acetal compound in hot dilute hydrochloric acid (1-10%). The solution is allowed to cool and is then chilled whereupon the hydrate crystallizes. For a higher purity product, it may be desirable to treat the hot solution with activated charcoal and filtering before crystallization begins.

The alkanolamines used in preparing the compounds of this invention are commercially available. They include ethanolamine; 2-amino-2-methylpropanol; 2-amino-1,3-propanediol; 2-amino-2-methyl-1,3-propanediol; 2-amino-2ethyl-1,3-propanediol; 2-amino-1-butanol; and tris(hydroxymethyl)aminomethane.

The alkaline conditions used in the production of the compounds of this invention can be provided by any suitable alkalinizing agent including sodium and potassium hydroxides or alkoxides and alkylamines. Also, excess alkanolamine reagent can be used, but generally stronger amines such as tertiary alkylamines, e.g. triethylamine or tributylamine, are preferred.

The amount can be varied considerably, but it should be sufficient to provide, if in an aqueous system, a pH of from about 8 to 11. Generally this can be provided by an amount of, e.g., from 0.01 to 1.0%.

It is an embodiment of this invention to provide a method for promoting the growth of animals and improving their feed efficiency by administering to them a compound of the class of 2-oxazolidinylquinoxaline-1,4-dioxide. The oxazoline moiety can be substituted or unsubstituted, e.g. methyl or hydroxymethyl substituted.

It is contemplated that the method of this invention will be particularly suitable for animals raised for food such as fowl, ruminants, swine and rabbits. Although all members of the fowl family—i.e. chickens, turkeys, geese, ducks, guinea, pheasant and quail—will show increased rate of growth and improved feed efficiency, the method is particularly valuable for chicken broilers and turkeys. Of the ruminants, e.g. cattle, sheep and goats, the method is particularly of value for cattle, e.g. steers.

The method of administration of a compound of this invention is to incorporate it in the feed rations intended for the animal at a concentration of about 50–150 g/ton of feed, preferably about 100 g/ton. The animals are permitted to feed at liberty throughout the growth period. There are many specialized feed rations for different species of animals. The compounds of this invention can be used with any of the known rations.

The term "feed rations" is intended to mean the food provided for the animals, and it is not intended that the invention be limited thereby. Preferably the compound is thoroughly mixed with the feed ration so that it is uniformly dispersed throughout. However, it is also contemplated that it could be sprinkled on the daily food supplies in the form of a powder or as pellets. Thus, it is not intended that the invention be limited to any particular mode of administration.

Any of the known feed rations can be used in the practice of this invention and it is not intended that the invention be limited by the formulation of the ration. Feed rations are formulated to provide the animal for which it is intended with the essential nutrients, minerals, vitamins, bulk, etc. Formulation of these rations are well within the skill of nutritionists.

The invention will be better understood with reference to the following examples. It is understood that examples are intended only to illustrate the invention and it is not intended that the invention be limited thereby.

EXAMPLE 1

2-Formylquinoxaline-1,4-dioxide hydrate 4 g (0.02 mole) was dissolved at 60°–65° C. in 30 ml methanol containing 2–4 drops of triethylamine. The solution was agitated and 1.5 g (0.0246 mole) of ethanolamine was added. The heat source was removed and the mixture was then allowed to cool slowly to room temperature with stirring. There was obtained a precipitate of 2-(2-oxazolidinyl)quinoxaline-1,4-dioxide (hereinafter designated P-2244 for convenience). The precipitate was filtered, rinsed with a small amount of methanol, then dried. The resulting product had a melting point of 153°–154° C. and analyzed as follows:

|  | C | H | N |
|---|---|---|---|
| Calc., % | 56.89 | 4.78 | 18.10 |
| Found, % | 56.69 | 4.73 | 17.96 |

Growth promotion and improved feed efficiency were determined as follows:

Two groups of male two-day-old broiler-type chicks were placed into Petersime starter batteries and given feed and water ad libitum for the duration of each test. Each group was subdivided into six sub-groups with ten birds in each sub-group, thus providing sixty birds per group. One group received the basal feed ration, as given in Table 1 and served as a control. The other group received the same ration, but in addition there was included P-2244 at a concentration of 100 g/ton. The basal ration was a rye diet which alters the microflora of the gut in the bird which results in a growth depressant effect. When a growth stimulant or promotant is added to the diet, the effect on the birds performance will be more apparent than if a corn base diet was used.

The test period was thirteen days. Individual live body weights and pen feed efficiencies were taken at 2 and 14 days of age. The data are given in Table 2. Growth promotion of P-2244 is indicated by the average percentage increase in weight over that of the control group, and feed efficiency is taken as the ratio of weight of feed consumed to weight gained and the increase of this ratio over the ratio exhibited by controls is taken as the increase of feed efficiency.

TABLE 1

| Basal Ration | |
|---|---|
| Ground rye | 55.0 |
| Soybean meal 44% | 29.0 |
| Fish solubles 40% | 2.0 |
| Meat and bone meal 50% | 5.0 |
| Dehydrate alfalfa meal | 1.2 |
| Dried whey | 1.0 |
| Fat | 4.0 |
| Dicalcium phosphate 24% ca 18.5%P | 1.0 |
| Livestock mineral 24% Ca 6%P | .75 |
| Salt | .50 |
| Vitamin and trace mineral premix | .50 |
| | 100 lbs |
| Analysis | |
| Protein | 23.3% |
| Calcium | 1.03% |
| Phosphorus | 0.84% |
| M.E. kg Calories/lb | 1260 |

TABLE 2

| Mean Body Weight Gain and Feed Per Gain Ratio (F/G) | | | | | |
|---|---|---|---|---|---|
| Treatment | Pen No. | Body Weight Gain, g | % Increase | F/G | % Increase |
| P-2244 | 2 | 178.8 | | 1.61 | |
| | 9 | 177.6 | | 1.56 | |
| | 11 | 197.1 | | 1.54 | |
| | 13 | 187.9 | | 1.56 | |
| | 16 | 200.2 | | 1.52 | |
| | 24 | 210.0 | | 1.58 | |
| Average | | 191.9 | 32.6 | 1.56 | 7.7 |
| Control | 1 | 140.6 | | 1.68 | |
| | 5 | 145.0 | | 1.66 | |
| | 12 | 150.6 | | 1.70 | |
| | 15 | 153.0 | | 1.69 | |
| | 20 | 126.2 | | 1.74 | |
| | 22 | 152.7 | | 1.69 | |
| Average | | 144.7 | — | 1.69 | — |

The test shows that the addition of P-2244 to the basal ration produced an improved growth rate nearly 33% more than that provided by the basal ration, and the feed efficiency was improved 7.7%.

EXAMPLE 2

The experiment of Example 1 was repeated in all essential details except that 2-amino-1-butanol was substituted for ethanolamine in an equimolar amount. There was obtained 2-(4-ethyl-2-oxazolidinyl)quinoxaline-1,4-dioxide, m.p. 158°–160° C. It analyzed as follows:

|  | C | H | N |
|---|---|---|---|
| Calc., %: | 59.97 | 5.79 | 16.08 |
| Found, %: | 59.66 | 5.78 | 16.01 |

It was designated P-2232 for convenience.

The chick-feeding test was repeated in all essential details using P-2232 instead of P-2244. The results obtained are as follows:

|  | Control* | P-2232** |
|---|---|---|
| Weight gain per pen, av, g | 208.77 | 226.97 |
| Increased weight gain, % | — | 8.7 |
| Feed efficiency+ | 1.56 | 1.45 |
| Increased feed efficiency, % | — | 7.1 |

*Basal ration only.
**Basal ration plus P-2232 at 100 g/ton of feed.
+Feed efficiency is ratio of the weight of feed consumed to the gain in weight.

The test showed that the addition of P-2232 to the basal ration produced an improved growth rate nearly 9% more than the basal ration, and the feed efficiency was improved 7.1%.

EXAMPLE 3

The experiment of Example 1 was repeated in all essential details except that 2-amino-2-methylpropanol was substituted for ethanolamine in an equimolar amount. There was obtained 2-(4,4-dimethyl-2-oxazolidinyl)quinoxaline-1,4-dioxide, m.p. 182°–184° C. It was designated P-2240 for convenience. It analyzed as follows:

|  | C | H | N |
|---|---|---|---|
| Calc., %: | 59.76 | 5.79 | 16.08 |
| Found, %: | 60.36 | 5.94 | 16.02 |

The chick feeding test was repeated in all essential details using P-2240 instead of P-2244. The results obtained are as follows:

|  | Control | P-2240 |
|---|---|---|
| Weight gain per pen, av, g | 116.5 | 153.7 |
| Increased weight gain, % | — | 31.9 |
| Feed efficiency | 1.71 | 1.56 |
| Increased feed efficiency, % | — | 8.9 |

EXAMPLE 4

The experiment of Example 1 was repeated in all essential details except that 2-amino-2-methyl-1,3-propanediol was substituted for ethanolamine in an equimolar amount. There was obtained 2-(4-hydroxymethyl-4-methyl-2-oxazolidinyl)quinoxaline-1,4-dioxide, m.p. 167°–169° C. It was designated P-2239 for convenience. It analyzed as follows:

|  | C | H | N |
|---|---|---|---|
| Calc., %: | 56.31 | 5.45 | 15.16 |
| Found, %: | 56.70 | 5.42 | 15.06 |

The chick feeding test was repeated in all essential details using P-2239 instead of P-2244. The results obtained are as follows:

|  | Control | P-2239 |
|---|---|---|
| Weight gain per pen, av, g | 116.5 | 133.5 |
| Increased weight gain, % | — | 14.6 |
| Feed efficiency | 1.71 | 1.64 |
| Increased feed efficiency, % | — | 4.1 |

EXAMPLE 5

The experiment of Example 1 was repeated in all essential details except that tris(hydroxymethyl)aminomethane was substituted for ethanolamine in an equimolar amount. There was obtained 2-[(4,4-bishydroxymethyl)-2-oxazolidinyl]quinoxaline-1,4-dioxide, m.p. 159°–161° C. It was designated P-2234 for convenience. It analyzed as follows:

|  | C | H | N |
|---|---|---|---|
| Calc., %: | 53.24 | 5.16 | 14.33 |
| Found, %: | 53.78 | 5.26 | 14.27 |

The chick feeding test was repeated in all essential details using P-2234 instead of P-2244. The results obtained are as follows:

|  | Control | P-2234 |
|---|---|---|
| Weight gain per pen, av, g | 217.25 | 226.03 |
| Increased weight gain, % | — | 4.0 |
| Feed efficiency | 1.55 | 1.51 |
| Increased feed efficiency, % | — | 2.6 |

EXAMPLE 6

The experiment of Example 1 was repeated in all essential details except that 2-amino-1,3-propanediol was substituted for ethanolamine in an equimolar amount. There was obtained 2-(4-hydroxymethyl-2-oxazolidinyl)quinoxaline-1,4-dioxide, m.p. 165°–167° C. It was designated P-2241 for convenience. It analyzed as follows:

|  | C | H | N |
|---|---|---|---|
| Calc., %: | 54.75 | 4.98 | 15.96 |
| Found, %: | 54.78 | 4.99 | 15.92 |

The chick feeding test was repeated in all essential details using P-2241 instead of P-2244. The results obtained are as follows:

|  | Control | P-2241 |
|---|---|---|
| Weight gain per pen, av, g | 165.7 | 203.5 |
| Increased weight gain, % | — | 22.8 |
| Feed efficiency | 1.57 | 1.47 |
| Increased feed efficiency, % | — | 6.3 |

What is claimed is:

1. Substituted quinoxaline dioxides represented by the formula

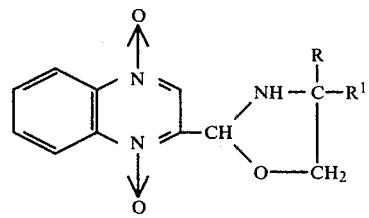

where R and R[1] can be hydrogen, methyl, ethyl or hydroxymethyl and can be the same or different.

2. A compound of claim 1 wherein R and R¹ are hydrogen.

3. A compound of claim 1 wherein R and R¹ are methyl.

4. A compound of claim 1 wherein R and R¹ are hydroxymethyl.

5. A compound of claim 1 wherein R is hydrogen and R¹ is ethyl.

6. A compound of claim 1 wherein R is hydroxymethyl and R¹ is methyl.

7. A compound of claim 1 wherein R is hydroxymethyl and R¹ is hydrogen.

8. A method for promoting the growth of animals comprising incorporating in the animal's feed rations in an amount of from 50 to 150 g/ton of feed a compound represented by the formula

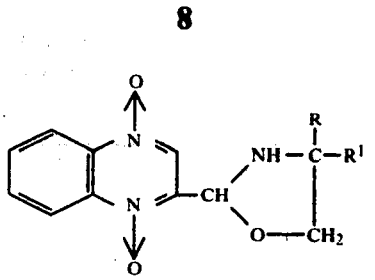

where R and R¹ can be hydrogen, methyl, ethyl or hydroxymethyl and can be the same or different.

9. A feed ration for animals consisting essentially of a feed ration containing additionally a compound of claim 1 in an amount of 50–150 g/ton of the feed ration.

10. The method of claim 8 wherein R is hydroxymethyl and R¹ is hydrogen.

11. The method of claim 8 wherein R and R¹ are hydrogen.

12. The method of claim 8 wherein R and R¹ are methyl.

13. The method of claim 8 wherein R and R¹ are hydroxymethyl.

14. The method of claim 8 wherein R and R¹ are ethyl.

15. The method of claim 8 wherein R is hydroxymethyl and R¹ is methyl.

* * * * *